United States Patent
Michaud (10) Patent No.: US 12,417,211 B2
(45) Date of Patent: Sep. 16, 2025

(54) HIGH-PERFORMANCE REMOTE FILE SYSTEM META DATA

(71) Applicant: Dell Products L.P., Round Rock, TX (US)

(72) Inventor: Adrian Michaud, Carlisle, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/647,749

(22) Filed: Jan. 12, 2022

(65) Prior Publication Data

US 2023/0222102 A1 Jul. 13, 2023

(51) Int. Cl.
*G06F 16/176* (2019.01)
*G06F 16/182* (2019.01)

(52) U.S. Cl.
CPC ........ *G06F 16/1774* (2019.01); *G06F 16/184* (2019.01)

(58) Field of Classification Search
CPC ................. G06F 16/1774; G06F 16/184
See application file for complete search history.

(56) References Cited

U.S. PATENT DOCUMENTS

| | | | | |
|---|---|---|---|---|
| 6,389,420 B1* | 5/2002 | Vahalia | ............... | G06F 16/1774 709/248 |
| 7,822,728 B1* | 10/2010 | Chandler | ............ | G06F 16/1774 707/700 |
| 8,589,550 B1* | 11/2013 | Faibish | ................ | G06F 3/0662 709/225 |
| 8,862,561 B1* | 10/2014 | Nesbit | ................ | G06F 11/1004 707/827 |
| 10,430,389 B1* | 10/2019 | Gupta | ................... | G06F 16/13 |
| 10,713,121 B1* | 7/2020 | Javadekar | ........... | G06F 11/1451 |
| 10,951,705 B1* | 3/2021 | Desai | .................. | G06F 16/183 |
| 2005/0251500 A1* | 11/2005 | Vahalia | .............. | G06F 16/1774 |
| 2012/0150924 A1* | 6/2012 | Lee | ......................... | G06F 3/067 707/821 |
| 2014/0379767 A1* | 12/2014 | Halevy | .............. | H04L 67/1097 707/827 |
| 2017/0060432 A1* | 3/2017 | Wang | ................... | G06F 3/0631 |
| 2017/0277715 A1* | 9/2017 | Strauss | .............. | G06F 16/1865 |
| 2022/0342866 A1* | 10/2022 | Kotwal | ................. | G06F 16/188 |

OTHER PUBLICATIONS

Aguilera et al. "Remote Regions: A Simple Abstraction for Remote Memory", Jul. 11-13, 2018, https://www.usenix.org/system/files/conference/atc18/atc18-aguilera.pdf (Year: 2018).*

* cited by examiner

Primary Examiner — Matthew J Ellis
(74) Attorney, Agent, or Firm — Workman Nydegger (57) ABSTRACT

File system management is disclosed. File system metadata is stored in local memory of a client. The portion of local memory storing the file system metadata is under control of the metadata server. The construction and management of the metadata stored in the local memory of the client is driven, initiated and managed by the remote metadata server.

16 Claims, 4 Drawing Sheets

HIGH-PERFORMANCE REMOTE FILE SYSTEM META DATA

FIELD OF THE INVENTION

Embodiments of the present invention generally relate to file systems including distributed file systems and file system metadata. More particularly, at least some embodiments of the invention relate to systems, hardware, software, computer-readable media, and methods for sharing metadata, such as file system metadata, in a computing environment.

BACKGROUND

Many file systems, such as NFS (Network File System) and pNFS (parallel NFS), control the manner in which clients access files or data. Before accessing the actual files, it is often necessary to obtain file system metadata. A client, for example, must obtain file system layout metadata prior to accessing the file.

Traditionally, file system metadata is exchanged using some type of messaging, data streaming, or network packet exchanges (generally referred to herein as messaging). However, this process does not scale well and is inefficient when managing large amounts of clients and servers within a coherent cluster of systems. Messaging is also inefficient when there is a desire to provide and allow high concurrent use of file system metadata by many clients.

More specifically, traditional servers require compute resources to build and construct metadata messages before the servers can exchange the metadata with clients. When servicing many clients asynchronously, there creates a need to dynamically allocate and manage the required resources. Clearly, as the number of clients increase, the demand on compute and other dynamic resources will also increase. Building and constructing metadata messages causes the servers to become a bottleneck or contention point and may impact IOPs (Input/output operations per second).

The process of exchanging metadata can also impact the IOPs of the client. More specifically, the client must also use compute resources to receive the incoming metadata, process the incoming metadata and then construct or manage in-memory metadata structures. Resources used to manage metadata messages are not available to the application. This can also impact the number of IOPS a client can generate because the pending file system metadata updates/changes may block data processing or IO operations that are dependent on the metadata updates/changes.

The process of exchanging messages also involves communications using network protocol stacks (impacted by the network protocol stack (e.g., TCP—Transmission Control Protocol)). Messages passed over the network must pass through multiple layers of the protocol stack on both the client and the server for both incoming and outgoing messages.

For example, a client may send a file IO request to a server. This request is processed by the various layers of the protocol stack at both the client and the server. The response is similarly passed through the protocol stack at both the client and the server. Further, this does not account for the need to actually send the metadata or access the file. In some instances, it may be necessary to send significant file system metadata even before the IO request can be sent. Even if no metadata is needed, there is inherent overhead and latency associated with the flow of data or messages between a client and a server.

In addition to these concerns, traditional clients and servers need to enforce mutual exclusion to ensure an exclusive right or ownership for some file functions. For example, if a first client is writing to a file, attempts by other clients to delete or truncate the file need to be prevented. This may be achieved using an exclusive lock or lease. However, the overhead associated with providing mutual exclusion capabilities is significant, particularly if distributed mutual exclusion is implemented on top of RPC (Remote Procedure Call), which is implemented on the protocol stack (e.g., TCP).

Systems and methods are needed to improve the manner in which metadata such as filesystem metadata is shared in a computing environment between clients and servers.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to metadata management including file system metadata management. More particularly, at least some embodiments of the invention relate to systems, hardware, software, computer-readable media, and methods for managing metadata in a filesystem. Embodiments of the invention generally relate to, by way of example only, messaging operations, metadata operations, memory control operations, file system operations and management, and the like or combination thereof.

Embodiments of the invention provide a client/server file system management system with a distributed and disaggregated shared memory architecture. Embodiments of the invention provide a file system management system wherein the construction and management of the metadata is driven, initiated and managed by the metadata server, which may be remote from the client. This contrasts with conventional distributed file systems, where the clients construct and manage metadata in their local memory.

Figure 1:
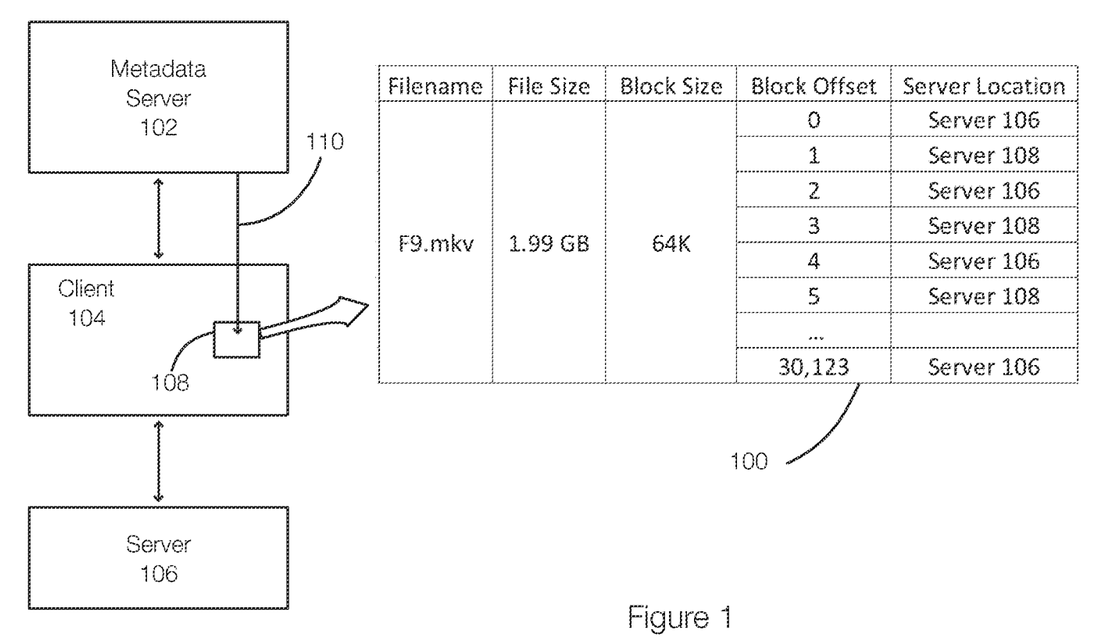
FIG. 1 discloses aspects of file system metadata in a computing environment that includes a file system.

FIG. 1 illustrates an example of a file system that includes file system metadata management. FIG. 1 is also used to contrast embodiments of the invention with conventional file system management systems. Embodiments of the invention may be implemented in or adapt a file system such as parallel Network File System (pNFS). FIG. 1 illustrates a metadata server 102, a client 104 and a server 106. The metadata server 102, the client 104 and the server 106 may be computing devices with processors, memory, networking components and other hardware. The server 102, the client 104 and the server 106 may also be implemented using virtual machines or containers.

FIG. 1 also illustrates metadata 100 for a 1.99 GB movie file. In this example, the client 104 is performing many random IOs to a large movie file (F9. mkv). The metadata 100 is file layout metadata, but embodiments of the invention are not limited to file layout metadata.

Conventionally, when the client 104 opens the movie file, the client 104 requests the file layout metadata from the metadata server 102. The metadata 100 (simplified) requested by the client 104 is received by the client 104 from the metadata server 102. In this example, the metadata 100 is illustrated as a table of locations where all blocks or segments of the file reside on the server 106. The blocks or segments may reside on multipole servers. Thus, the server 106 is representative of multiple distributed servers. Thus, the blocks of the movie file may reside on different servers.

Conventionally, the client 104 constructs the file layout metadata 100 in local memory 108 after requesting the file layout metadata from the metadata server 102. Thus, the metadata server 102 and the client 104 may exchange messages such that the client 104 can construct the file layout metadata 100 in the memory 108. If multiple clients are accessing the same file, each client will have a private copy of the same file layout metadata 100 in their respective local memory.

More specifically to open and read a file in a conventional file system, the client 104 issues a file open request to the metadata server 102. The client 104 then requests the file layout metadata from the metadata server 102. Next, the client 104 constructs the file layout metadata 100 in private local memory 108. The client 104 uses the file layout metadata 100 in private local memory 108 to perform direct IO to the storage of the server 106. The client 104 may be interrupted by the metadata server 102 to recall the layout metadata 100. The client 104 releases the file layout metadata 100 when accessing the file is complete.

When implemented in this manner, this scenario illustrates each of the problems previously described. Exchanging metadata messages between the client 104 and the metadata server 102 requires resources of the server 104, particularly when multiple clients are accessing the server 104. Servicing metadata requests becomes a bottleneck, requires resources, and can delay pending IO requests. Additional delay and latency are introduced due to the need to process messages via the protocol stack. Finally, any lock can introduce communication overhead.

Further, traditional clients manage their file system metadata privately in their own local memory. Clients request and generate file layout data in their local memory after fetching metadata from remote metadata servers.

FIG. 1 also illustrates how embodiments of the invention can be implemented in the distributed file system. In embodiments of the invention, the metadata 100 is still present in the memory 108 of the client. However, the memory 108 (or portion thereof containing the metadata 108) is controlled by the server 102. Thus, rather than requiring the client 104 to construct the metadata 100 received in messages from the server 102, the memory 108 is configured such that the metadata server 102 can write the metadata 100 to the memory. This frees resources of the client and also reduces some of the requirements on the server 102. The construction and management 110 of the metadata 100 is initiated, driven, and managed by the remote metadata server 102—not by the client 104.

Figure 2:
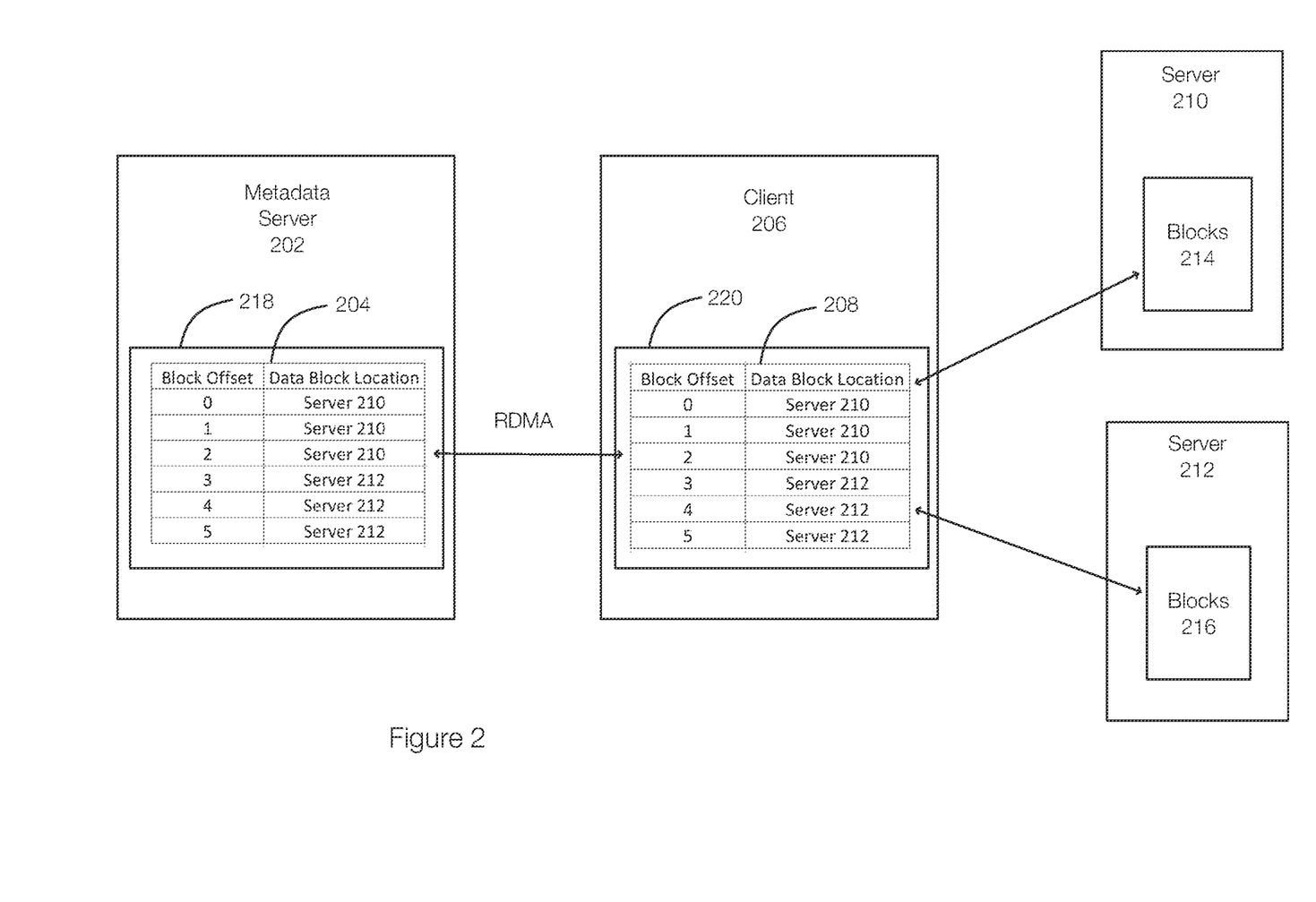
FIG. 2 discloses additional aspects of exchanging file system metadata in a computing environment.

FIG. 2 discloses aspects of metadata management. In FIG. 2, the metadata 208 stored in the memory 220 at the client 206 is owned and controlled by the metadata server 202 using, by way of example only, RDMA (Remote Direct Access Memory). This allows the metadata server 202 to lock, update, truncate, expand, or otherwise control the file layout metadata 208 stored in the memory 220 of the client 206. These actions may be performed by the metadata server 202 using atomic locking operations and RDMA sends (e.g., Write verb, Post verb), or the like at any point in time. The client 206 may perform local atomic locking prior to accessing the memory 220 and more specifically prior to accessing the metadata 208. In one example, when the client 206 locks the memory 220, the lock is a local memory semantic lock operation that the metadata server 202 is able to see in the event that the metadata server 202 needs to remotely lock or update the memory 220.

The metadata server 202 may enforce an exclusive ownership lock on the metadata 208 in the memory 220 when deleting or truncating the metadata 208. Unless locked by the metadata server 202, the client 206 is able to concurrently access the metadata 208 in parallel and directly access the servers 210 and 212, which store blocks 214 and 216 that constitute the file without any further communication or coordination with the metadata server 202.

The metadata server 202 may thus store (or construct) the metadata 204 on the server side in the server memory 218. The metadata server 202 is able to write the metadata 204 directly to the memory 220 or portion thereof that has been set apart and/or registered to be under the control and ownership of the metadata server 202.

Figure 3:
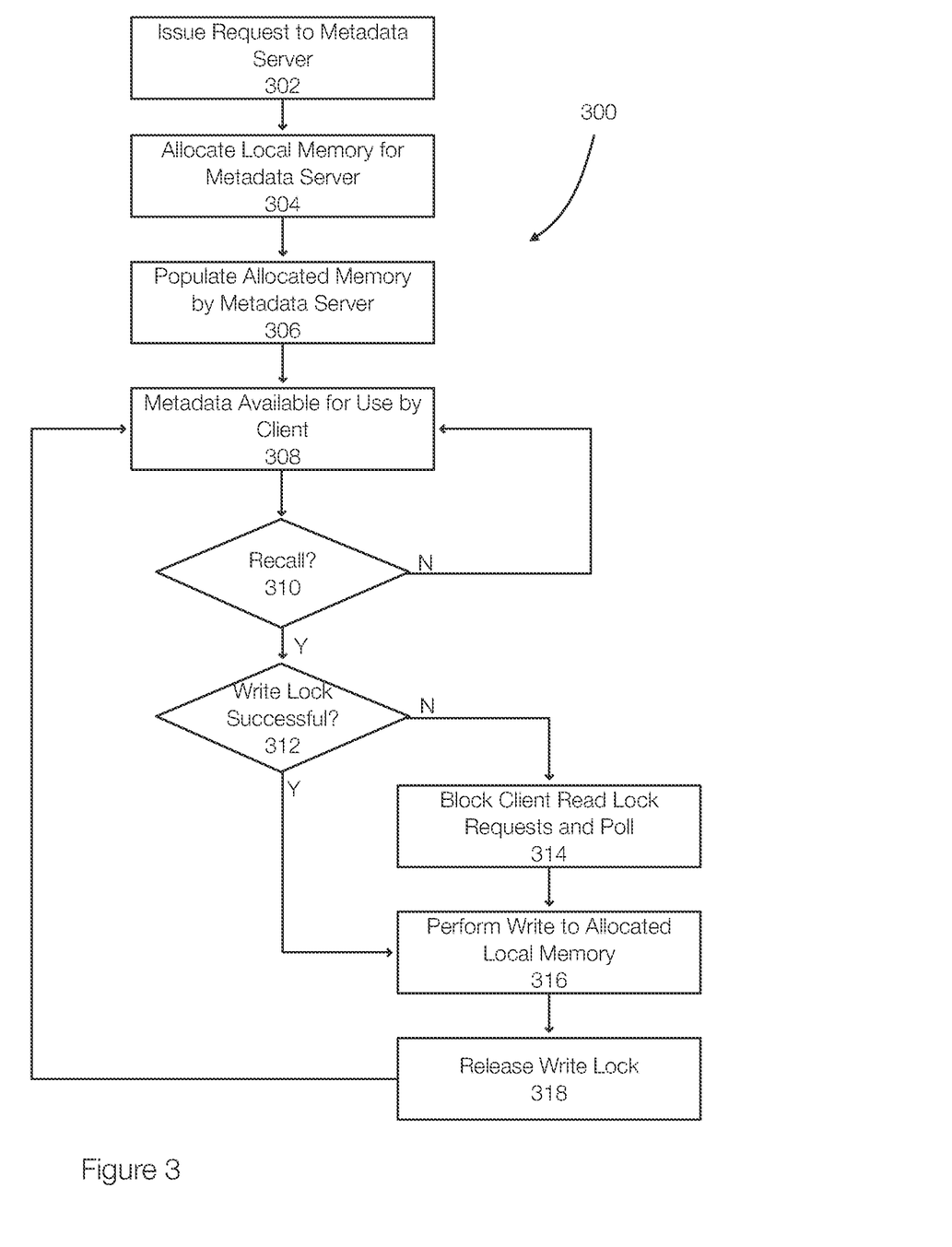
FIG. 3 discloses aspects of a method for exchanging file system metadata.

FIG. 3 discloses aspects of a method for managing metadata. The method 300 may be performed in the context of a distributed file system such as, by way of example only, pNFS. The method 300 generally relates to the manner in which metadata, such as file system metadata, is managed in a computing system. Generally, file system metadata is controlled by the metadata server, even if stored in local memory of the client. This reduces overhead and improves the operating efficiency of the computing system.

In one example, a request for metadata is issued 302 to a server from a client. The metadata request may relate to various operations including an IO operation, a read operation, a write operation, or the like.

Once the request is issued (or before), local memory of the client is allocated 304 for the metadata server. In one example, the client allocates local RDMA registered memory and provides the metadata server with an RDMA handle for the allocated memory. This allows the metadata server to populate or write 306 metadata to the allocated memory of the client. Further, the metadata is owned and controlled by the metadata server.

The metadata, once written to the allocated memory of the client, is then available 308 for use by the client. For example, the client may perform a local memory semantic atomic compare and swap within the allocated memory to lock the file layout metadata. Advantageously, this does not occur over a network but occurs withing the local memory of the client. The allocated memory may include, by way of example only, L1/L2/L3 cache memory or DIMM memory or the like that is local to the client. In one example, multiple concurrent local read locks may be performed.

This allows the client to use the metadata in the local memory to perform the operation related to the initial request. If the client is reading a movie file, the client will issue read locks to read the metadata stored in its local memory and then access the file directly from the locations specified in the metadata. In one example, servers and clients can each gain read locks concurrently. However, whenever a write lock is requested, the write lock becomes exclusive and no other write or read locks will be granted until the single exclusive write lock is relinquished. In other words, reading is non-destructive to the data and, as a consequence, multiple readers and read locks are allowed.

It may be necessary to perform a recall (Y at 310). A recall may refer generally to a situation where the server may need to perform an action on the metadata stored in the allocated memory (e.g., modify, truncate). If the server needs to recall the metadata, an exclusive write lock may be performed using the atomic RDMA compare and swap. If successful (Y at 312), the write or other action is performed 316 with respect to the metadata in the allocated memory by the metadata server.

If the lock is not successful (N at 312), the metadata server may block 314 subsequent read locks from the client and poll the allocated memory. Once all of the existing client locks have expired, the metadata server can lock the memory and perform the write 316 or other action. Once the write or other action is performed, the lock is released 318 and the client may again use the metadata stored in the allocated memory. In other words, when the metadata server desires to write to the metadata at the client, the server needs to acquire a write lock. In one example, the write lock is granted to the metadata server only if there are currently zero read locks granted and no other write locks are present.

In one example, the lock may be released automatically or a separate atomic write will be issued to release the exclusive lock. This allows the client to reacquire a shared read lock prior to accessing the metadata.

As a result, embodiments of the invention allow file system metadata within a client's local memory to be constructed, updated, truncated, or otherwise controlled by a remote metadata server asynchronously. The ownership is controlled using various atomic actions such as atomic RDMA Compare and Swap or atomic RDMA Fetch and Add. Although embodiments of the invention are discussed in the context of RDMA, embodiments are not limited thereto.

The metadata is accessed via memory semantics after a client-side shared read lock is obtained to RDMA registered client memory. Advantageously no other communication is needed by a client to perform file IO operations other than atomic client-side sharded read locks on local client memory.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, file system operations which may include, but are not limited to, operations related to file system metadata including metadata control operations.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, virtual machines (VM), containers, or the like.

Particularly, devices in the operating environment may take the form of software, physical machines, VMs, containers, or any combination of these, though no particular device implementation or configuration is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: allocating a portion of local memory of a client, by the client, to a metadata server such that the portion of local memory is owned and controlled by the metadata server, writing metadata, by the metadata server, to the portion of local memory, and controlling access to the metadata using locks, wherein the client accesses the metadata using at least read locks and the metadata server accesses the metadata using at least write locks.

Embodiment 2. The method of embodiment 1, further comprising performing a read lock, by the client or performing multiple read locks by one or more clients.

Embodiment 3. The method of embodiment 1 and/or 2, further comprising reading the metadata by the client and accessing a server for data of a file identified in the metadata.

Embodiment 4. The method of embodiment 1, 2, and/or 3, further comprising performing a recall by the metadata server in order to perform an operation on the metadata, the operation including at least one of modifying the metadata, truncating the metadata, update the metadata, expand the metadata, or combination thereof.

Embodiment 5. The method of embodiment 1, 2, 3, and/or 4, further comprising, when an existing read lock of the client is present, blocking subsequent read lock requests and when the read lock has expired and no read locks are present, performing a write lock by the metadata server and writing to the portion of local memory.

Embodiment 6. The method of embodiment 1, 2, 3, 4, and/or 5, further comprising releasing the write lock.

Embodiment 7. The method of embodiment 1, 2, 3, 4, 5, and/or 6, further comprising allowing read locks by the client on the portion of local memory.

Embodiment 8. The method of embodiment 1, 2, 3, 4, 5, 6, and/or 7, wherein the portion of local memory is registered as RDMA (Remote Direct Memory Access) memory, wherein the read locks are semantic atomic compare and swap operations.

Embodiment 9. The method of embodiment 1, 2, 3, 4, 5, 6, 7, and/or 8, further comprising providing the metadata server with a handle to the portion of local memory.

Embodiment 10. The method of embodiment 1, 2, 3, 4, 5, 6, 7, 8, and/or 9, further comprising receiving a request related to a file at the metadata server from the client.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
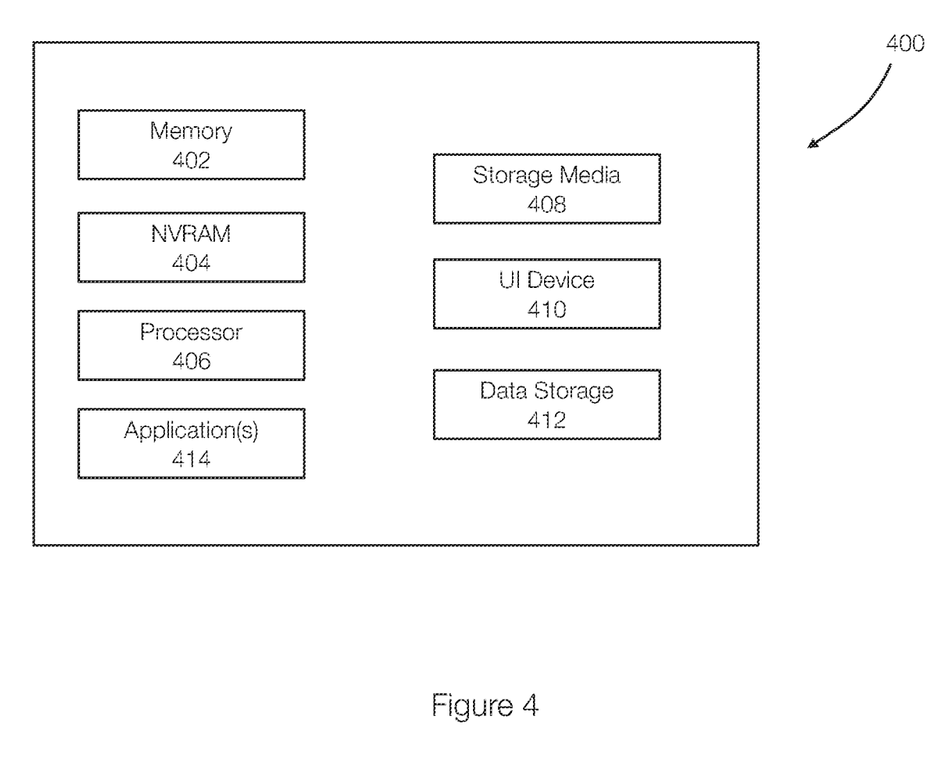
FIG. 4 discloses aspects of a computing device or a computing system.

With reference briefly now to FIG. 4, any one or more of the entities disclosed, or implied, by the Figures, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   allocating a portion of local memory of a client, by the client, to a metadata server such that the portion of local memory is owned and controlled by the metadata server by providing the metadata server with a handle for the portion of local memory, wherein the portion of local memory is registered as remote access memory;
   writing metadata, by the metadata server, to the portion of local memory, wherein the metadata is available to the client, wherein the client accesses the metadata using at least read locks and wherein the metadata server accesses the metadata using at least write locks;
   performing a recall operation, by the metadata server, wherein performing the recall operation includes issuing a write lock, by the metadata server, wherein the recall operation performed in order to perform an operation on the metadata stored in the portion of local memory of the client;
   when the metadata server is unable to obtain the write lock because an existing read lock of the client is present, blocking subsequent read lock requests;
   when the existing read lock has expired and no read locks are present on the local portion of memory, performing the write lock by the metadata server; and
   writing to the portion of local memory, by the metadata server, after the portion of local memory is write locked.

2. The method of claim 1, further comprising performing a read lock, by the client or performing multiple read locks by one or more clients.

3. The method of claim 1, wherein the operation includes at least one of modifying the metadata, truncating the metadata, update the metadata, expand the metadata, or combination thereof.

4. The method of claim 1, further comprising releasing the write lock.

5. The method of claim 4, further comprising allowing read locks by the client on the portion of local memory.

6. The method of claim 1, wherein the remote access is registered as RDMA (Remote Direct Memory Access) memory, wherein the read locks are semantic atomic compare and swap operations.

7. The method of claim 6, further comprising providing the metadata server with an RDMA handle to the portion of local RDMA memory over a network.

8. The method of claim 1, further comprising receiving a request related to a file at the metadata server from the client.

9. A non-transitory storage medium having stored therein instructions that are executable by one or more hardware processors to perform operations comprising:
   allocating a portion of local memory of a client, by the client, to a metadata server such that the portion of local memory is owned and controlled by the metadata server by providing the metadata server with a handle for the portion of local memory, wherein the portion of local memory is registered as remote access memory;
   writing metadata, by the metadata server, to the portion of local memory, wherein the metadata is available to the client, wherein the client accesses the metadata using at least read locks and wherein the metadata server accesses the metadata using at least write locks;
   performing a recall operation, by the metadata server, wherein performing the recall operation includes issuing a write lock, by the metadata server, wherein the recall operation performed in order to perform an operation on the metadata stored in the portion of local memory of the client;
   when the metadata server is unable to obtain the write lock because an existing read lock of the client is present, blocking subsequent read lock requests;
   when the existing read lock has expired and no read locks are present on the local portion of memory, performing the write lock by the metadata server; and
   writing to the portion of local memory, by the metadata server, after the portion of local memory is write locked.

10. The non-transitory storage medium of claim 9, further comprising performing a read lock, by the client or performing multiple read locks by one or more clients.

11. The non-transitory storage medium of claim 9, wherein the operation includes at least one of modifying the metadata, truncating the metadata, update the metadata, expand the metadata, or combination thereof.

12. The non-transitory storage medium of claim 9, further comprising releasing the write lock.

13. The non-transitory storage medium of claim 12, further comprising allowing read locks by the client on the portion of local memory.

14. The non-transitory storage medium of claim 13, wherein the remote access is registered as RDMA (Remote Direct Memory Access) memory, wherein the read locks are semantic atomic compare and swap operations.

15. The non-transitory storage medium of claim 14, further comprising providing the metadata server with an RDMA handle to the portion of local RDMA memory over a network.

16. The non-transitory storage medium of claim 9, further comprising receiving a request related to a file at the metadata server from the client.

* * * * *

UNITED STATES PATENT AND TRADEMARK OFFICE
CERTIFICATE OF CORRECTION

PATENT NO. : 12,417,211 B2
APPLICATION NO. : 17/647749
DATED : September 16, 2025
INVENTOR(S) : Adrian Michaud Page 1 of 1

It is certified that error appears in the above-identified patent and that said Letters Patent is hereby corrected as shown below:

In the Specification

Column 3
Line 17, change "multipole servers" to – multiple servers –

Signed and Sealed this
Twenty-third Day of December, 2025

John A. Squires
*Director of the United States Patent and Trademark Office*